UNITED STATES PATENT OFFICE.

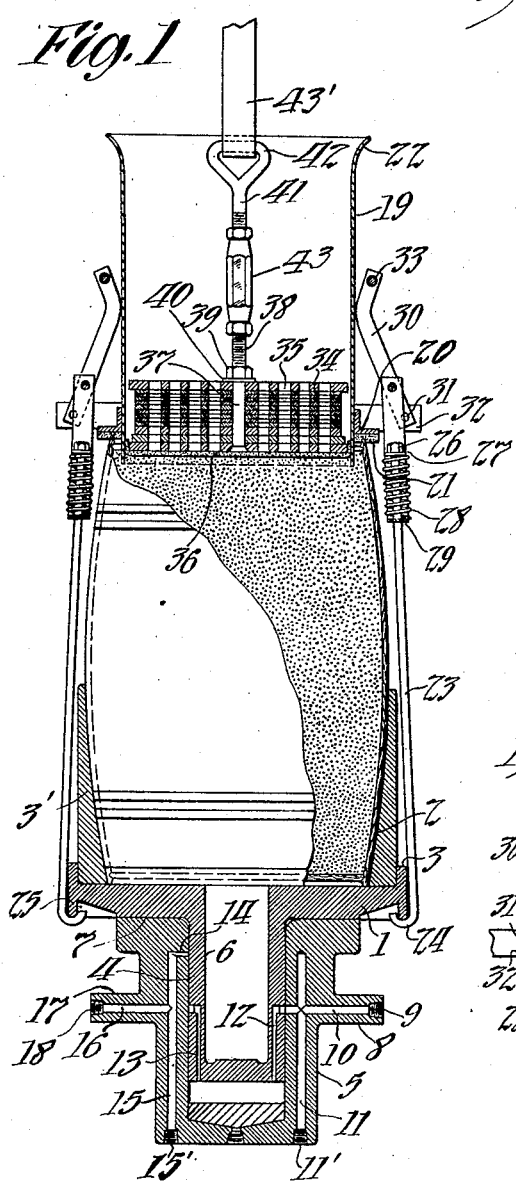

WILLIAM H. MASON, OF EASTON, PENNSYLVANIA, ASSIGNOR OF ONE-HALF TO WALTER S. MALLORY, OF EASTON, PENNSYLVANIA.

METHOD AND APPARATUS FOR PACKING MATERIAL.

1,360,000.        Specification of Letters Patent.     Patented Nov. 23, 1920.

Application filed April 7, 1915. Serial No. 19,664.

*To all whom it may concern:*

Be it known that I, WILLIAM H. MASON, a citizen of the United States, and a resident of Easton, in the county of Northampton and State of Pennsylvania, have invented certain new and useful Improvements in Methods and Apparatus for Packing Material, of which the following is a description.

My invention relates to a method and apparatus for packing material and more particularly pulverulent material such as Portland cement. For the export of such cement, it has heretofore been the custom to pack the same in a comparatively loose condition in wooden barrels. When the barrels packed in this way become knocked or shaken about in shipment, the cement becomes compacted in the barrels, so that after a little while the latter remain only partly filled and the cement offers substantially no resistance against the crushing in of the barrels by superincumbent bodies. The liability of the barrels to breakage is also increased by the fact that the dry Portland cement tends to absorb the moisture from the wood of which the barrels are ordinarily made. The breaking or crushing of the barrels permits the cement to leak out from the barrels in considerable quantities. This defect has been a very serious one in connection with the export of Portland cement and has entailed considerable loss. The principal object of my invention is to provide improved apparatus and an improved process for obviating this defect, and I preferably accomplish this object by apparatus and a method whereby the cement or other material is very tightly compacted in the barrel or other receptacle prior to the shipment thereof so that there is substantially no diminution in volume of the cement or other material during shipment and the said material together with the receptacle constitute a substantially solid mass, the cement resembling a soft stone and reinforcing the barrel and thus practically eliminating danger of crushing the barrel. Other objects of my invention will appear more fully in the following specification and appended claims:

In order that my invention may be more clearly understood, attention is hereby directed to the accompanying drawing illustrating my invention, and in which—

Figure 1 is a view partly in elevation and partly in vertical section illustrating the principal portion of my improved apparatus after the cement or other material has been completely compacted in a barrel;

Fig. 2 is a similar view illustrating a portion of the apparatus shown in Fig. 1 in a position prior to the compacting of the material in the barrel;

Fig. 3 is a front elevation partly in section of hoisting apparatus employed with the apparatus shown in Fig. 1;

Fig. 4 is a side view of the same; and

Fig. 5 is a side view of a detail of construction.

In all of the views, like parts are designated by the same reference numerals.

Referring to the drawings, the numeral 1 designates a table or support on which rests a barrel 2 into which the Portland cement or other material is to be packed. The table or support 1, as shown, is provided with an annular upwardly extending rim 3 within which fits a casing 3′ which rests upon said table or support. The casing 3′ fits about the lower portion of the barrel 2 and prevents the bulging out or other deformation or weakening thereof by reason of the large outward pressure thereon during the compacting operation and also holds the barrel in position on the table or support. Projecting from the lower central portion of the table or support 1 is a hollow cylindrical member or piston 4 which is adapted to reciprocate vertically in the cylinder 5. In order that the table or support 1 and the piston 4 may be made as light as possible, I preferably make the piston hollow, an opening 6 extending from a point near the bottom of the piston upwardly through the table or support 1. The cylinder 5 is provided with a flat upper portion 7 on which the table or support 1 is adapted to rest when in its lowermost position. The piston 4 is preferably caused to move upwardly in the cylinder by air, steam, or other fluid pressure, suitable passages being provided in the cylinder and piston for the inlet and exhaust of the air, steam, or other fluid. As shown in Fig. 1, the cylinder is provided with a tubular projection 8, this projection being provided with a threaded portion 9 by which suitable connection may be made to a source of compressed air or steam or other fluid under pressure, the said fluid being adapted to pass within the cylinder 5 through the passage 10. A vertical opening or passage 11, which may be drilled or otherwise formed in the cylinder, permits the connection of the source of compressed fluid with the lower end of cylinder 5. A threaded plug 11', as shown, closes the lower end of the opening 11. From the passage 10, the fluid is adapted to pass to the space within the cylinder and below the piston 4 by means of the passage 12 formed in the piston. When the piston is elevated by the expansion of the air or other fluid beneath the same, the inlet to the passage 12 is moved upwardly from the position shown in Fig. 1 out of communication with the opening 11 so that no further fluid is admitted within the cylinder until the piston has again moved downwardly sufficiently far to place the passage 12 in communication with the passage 10. The piston is provided with a passage 13, one end of which communicates with the space within the cylinder 5 below the piston, and the other end of which extends laterally and is adapted when the piston is in a sufficiently elevated position to communicate with an opening 14 leading into the vertical opening 15, which may be drilled or otherwise suitably formed in the cylinder 5. A threaded plug 15' closes the lower end of the opening 15. From the opening 15, a passage 16 extends laterally through a boss or projection 17 which is integral with the cylinder 5. The said boss or projection is provided with a threaded portion 18 whereby an exhaust pipe may be secured to the cylinder 5 in position to communicate with the passage 16. With this construction, when the piston is elevated sufficiently to place the passage 13 in communication with the opening 14, the air or other fluid in the cylinder under the piston escapes through the passage 13, the opening 14 and the passages 15 and 16, thereby permitting the platform and the parts carried thereby to drop by gravity back into the position shown in Fig. 1. By merely admitting the fluid into the passage 10, the piston and table as well as the parts carried thereby are accordingly caused to automatically rise and fall alternately as long as the fluid is admitted into said passage.

As the Portland cement or other material to be packed diminishes in volume to a considerable extent during the compacting thereof, the said material cannot all be placed in the barrel or other receptacle before the compacting of the material if the barrel or receptacle is to be filled after the compacting operation. I accordingly employ a reservoir, such as the cylindrical hood 19 from which the material passes into the barrel during the compacting operation. The hood is provided inwardly from its lower end with a circular flange 20, the lower surface of which has secured thereto a layer 21 of felt, rubber or other yielding material which is adapted to rest upon the upper edge of the barrel or other receptacle to form a tight joint between the hood and the barrel when the hood is secured in place on the barrel, as hereinafter described. The hood 19, as shown, extends downwardly into the receptacle 2 below the groove or crozing for receiving the head of the receptacle or barrel and is spaced from the side of the barrel below the flange 20. This arrangement not only tends to prevent the escape of material at the joint between the reservoir and receptacle, but also keeps the hereinafter described weight away from the side of the barrel and prevents the accumulation of material in said groove so that the head of the barrel may be easily inserted after the same is packed and prevents the paper lining used in such barrels from being torn. For convenience in the introduction into the hood of the material and the weight hereinafter described, the upper edge of the hood is preferably curved outwardly to a slight extent as shown at 22. For securing the hood to the barrel and also securing the latter to the table or support 1, I have shown a plurality of fastening means each comprising a rod 23 having at the lower end a hook-shaped portion 24 engaging under a flange 25 extending downwardly from the table or support 1 at the periphery thereof. The upper end of this rod is provided with a nut and a washer 26 and 27 respectively, the washer 27 bearing upon the upper end of a coiled spring 28 which encircles the upper end of the rod 23 and bears at its lower end upon a U-shaped member or stirrup 29, the parallel arms of which extend upwardly and are pivotally secured within a U-shaped operating member and clamp 30 which is pivotally connected as shown at 31 between parallel projections 32 extending outwardly from the hood 19. The pivot 31 and the pivot between the stirrup 29 and the member 30 are so arranged that when the parts are in the clamping position shown in Fig. 1, the spring 28 tends to rotate the member 30 in a direction about the pivot 31 toward the hood 19 and to hold the member 30 in engagement with the hood 19. The upper portion of the member 30 is bent outwardly at an angle to the major portion thereof to permit the cylindrical rod 33 at the upper end of said member to be readily grasped by the operator to pull said member 30 outwardly of the hood 19 until the pivot between the member 29 and the member 30 has been moved sufficiently away from the hood, referring to Fig. 1, to cause the spring 28 to move said member entirely out of clamping and into inoperative position, whereupon the hooks 24 may be readily disengaged from the flange 25, the hood 19 lifted from the barrel or receptacle 2 and the latter taken off the support or table 1. From the above it will be seen that each of the fastening means shown comprises a toggle joint. It is understood that when the barrel and hood are to be clamped in position, the hooks 24 are placed under the flange 25 and the members 30 moved inwardly by means of the rods 33 until they come in contact with the hood 19, in which position they will be held by the springs 28.

To facilitate the compacting of the material, I employ means for holding the material in the receptacle under pressure, the means shown comprising a weight 34 which is adapted to rest on the material and to move upwardly and downwardly with the same. This weight, as shown, is made up of a number of vertically alined disks which may be punched out of suitable material so as to provide openings 35, the openings of the various disks being alined with each other so as to permit the ready escape from the material of the air located between the small particles of the material before the latter is compacted. The weight, as the material is compacted, moves through the hood, being loose therein to allow the escape of air between the hood and the weight. I have provided means to prevent the escape of the powdered material past the weight and especially through the openings 35 during the compacting operation. For this purpose I preferably dispose between the weight and the material a pad or a layer of felt, linen or other porous fabric 36 which permits the air to escape therethrough. This pad also keeps the weight out of contact with the material and prevents the same from digging into the material. In Fig. 1, the weight is shown in its final position after the compacting is finished, while in Fig. 2 it is shown in the initial position before the compacting operation. This pad extends beyond the periphery of the weight and its edge is bent upwardly and engages the inside of the hood or reservoir substantially as shown, whereby the escape of material through the passage between the weight and the reservoir is prevented. As shown in the drawing, a rod 37 headed at its lower end extends through the centers of the disks and is provided with a threaded portion 38 which carries a nut 39 arranged above a washer 40 which engages the upper surface of the weight. By screwing down the nut 39, the various disks of which the weight is made may be securely fastened together. A member 41 having a threaded shank and a flattened eye 42 is secured to the rod 37 as by a turnbuckle 43. The distance between the eye 42 and bottom of the weight is substantially equal to the depth of the reservoir. A strap or other suitable flexible member 43′ extends through the eye 42 and is connected to suitable mechanism for raising or lowering the weight 34.

Referring to Figs. 3 and 4, the hoisting mechanism may comprise an air cylinder 44 provided with an inlet opening 45 and an outlet opening 46. The cylinder 44, as shown, is provided with an eye 47 whereby it may be suspended as by a hook (not shown) in suitable position above the table or support 1. Within the cylinder 44 is a piston 48 which has connected thereto, a piston rod 49 connected at its lower end to the head 50 to which the strap or other flexible member 43′ is secured. For holding the weight in elevated position, I preferably provide a plurality of bell crank levers 51 which are pivoted, as at 52, to the lower head of the cylinder 44 and are provided at their lower ends with inwardly directed hook-shaped portions 53 adapted to engage the under side of the head 50. The horizontal and vertical arms of each lever 51 are offset from each other and connected by a trunnion or horizontal pivot portion 51′ constituting the pivot 52. The upper end of each vertical arm as shown in Fig. 4 is arranged within a slot in said head. Tension springs 54 each secured at one end to a stationary member 55 on the lower head of the cylinder 44 and at their other ends to the outer ends of the horizontal arms of the bell crank levers 51, tend to hold the hooks 53 in operative engagement with the head 50. For releasing the said hooks or catches from the head 50 to permit the weight 34 to be lowered, I provide a lever 56 which is pivoted, as at 57, to a member 58 which is secured to one of the rods 59 connecting the upper and lower heads of the cylinder 44. This lever 56 is provided with a number of openings 60 through any one of which the link 61 may be pivotally connected to the lever 56. As shown in Fig. 3, the link 61 is connected to the innermost of the openings 60. The lower end of the link 61 is pivotally connected, as by links 63 and 64 to the outer ends of the horizontal arms of the levers 51. By drawing downwardly on the outer right hand portion of the lever 56, referring to Fig. 3, the links 61, 63 and 64 will be elevated and the hooks 53 drawn out of engagement with the head 50. A wire 65 or other suitable means may be secured to the outer end of the lever 56 to facilitate the operation thereof, the cylinder 44 being ordinarily located in a comparatively elevated position. The periphery of the head 50 and the inner surfaces of the hooks 53 are preferably upwardly and inwardly inclined so that as the head 50 is elevated, it wedges the hooks 53 outwardly until the head 50 is in a sufficiently elevated position to permit the hooks to engage the underside of the said head. A pin 56′ is arranged to be engaged by the upper side of lever 56 to limit the inward movement of the hooks 53. A suitable manually operable valve (not shown) may be employed to control the flow of fluid into the opening 45, and the opening 46 should be arranged at such an elevation as to open to the atmosphere the space within the cylinder 44 below the piston 48 when the weight has been raised to its upper position, thus permitting the escape of air from the cylinder. It is understood that at this time the manually operable valve controlling the flow of fluid into the opening 45 has been closed and the head 50 supporting the weight through the member 43' has been latched in elevated position. The employment of a flexible member, such as the strap 43', to connect the hoisting means to the weight permits free movement of the weight during the compacting operation without necessitating its disconnection from the hoisting apparatus. The member 41 also serves as a gage to indicate when the packing operation is completed.

In operation, the barrel or receptacle 2 is placed upon the table 1 with the casing 3' about the barrel, the table 1 being in its lowermost position, as shown in Fig. 1. The hood 19 is then placed upon the barrel, the hooks 24 placed over the flange 25, and the members 30 moved inwardly toward the hood to cause the latter to be securely connected to the barrel 2 and the barrel to be rigidly secured to the table or support 1. After this, a predetermined amount of the cement or other material to be packed is placed within the barrel and the hood. With the apparatus shown in the drawing, this material extends substantially to the upper end of the hood. The porous covering 36 is now placed on top of the material to be packed. By drawing downwardly the wire 65, the hooks 53 are disengaged from the head 50 and the weight 34 is permitted to move downwardly by gravity until it rests upon the covering 36 on the top of the cement or other material. By now turning on the air or other fluid to cause the same to flow into the opening 10, the table or support 1 and the parts carried thereby, including the weight 34, are caused to move automatically upwardly and downwardly with quick and violent movements, thus completely shaking the material to be packed and causing the same to become compacted, the compacting being increased by the impact or hammer action of the pressure means or weight 34 on the said material. During the compacting of the material, the air between the particles of material is forced out through the openings 35. The rapidity with which the table or support moves upwardly and downwardly may be varied by varying the pressure of the fluid admitted into the opening 10. The movement of the support and the parts and material carried thereby is a jigging movement. The specific jigging means used imparts to the receptacle a rapid movement in opposite directions, in which both the up and down strokes are quick and violent, resulting in a jar or shock at the end of each stroke so that each stroke is a compacting movement. The weight by reason of its inertia reacts against the cement or other material to be packed during each stroke in this jigging operation, for when the support is raised the weight tends to remain immovable, causing the material to be compacted during the upward movement, and when the receptacle moves downwardly to its lowermost limit, the weight will continue to move downwardly, compacting the material still further. Where the term "jigging" is used in the claims, it is intended to mean broadly a series of rapid shocks or jars. Where this term is used in its narrower sense, involving a jar on the upward movement, or for both the upward and downward movement, the language employed clearly points out such narrower meaning. When the material has been sufficiently compacted, air or other fluid is admitted through the inlet 45 to the space below the piston 48 to cause the latter to rise in the cylinder 44 and lift the weight 34 out of the hood 19. The latter may now be removed from the barrel 2 by moving the members 30 outwardly and disengaging the hooks 24. I preferably compact the material until it acquires the desired density and just fills the barrel or other receptacle, whereupon the head may be secured to the barrel. The compacted material, in case of such materials as Portland cement, resembles a soft stone in consistency.

My method which may be performed by the above described apparatus or by any other suitable apparatus is carried out substantially as follows: The receptacle and the extension thereof are first filled with a predetermined amount of material. Pressure is then continuously applied to the material at one end of the receptacle and at the same time the receptacle and extension are rapidly jigged or reciprocated, violently jarring and compacting the material therein until the entire mass has been so compacted that the extension of the receptacle is emptied and the material is all compacted within the receptacle into a mass of stone-like consistency, the air being permitted to escape during the operation without allowing any of the material to escape. My method can be used for filling receptacles with materials of various kinds such as Portland cement and can be varied according to the nature of the material and other conditions.

I have found that when Portland cement is packed by my improved method and apparatus, large weights may be carried by or dropped upon the receptacles without any substantial damage to the same, any blow or pressure on any part of the receptacle being transmitted to the cement and by it to the whole receptacle structure, so that the particular part of the receptacle which is subjected to the blow or pressure is relieved from a large part of the force thereof. Much lighter barrels or other receptacles may accordingly be used than heretofore, which results in a material saving in the cost of the receptacles. Furthermore, by reason of the fact that the material is compacted in the receptacles, much smaller receptacles may be used than heretofore for a given weight of cement. Various modifications may be made in the construction disclosed without departing from the spirit of my invention.

What I claim as new and desire to protect by Letters Patent of the United States is as follows:

1. In apparatus for packing material in receptacles, the combination of a support for the receptacle, a reservoir on the receptacle, unitary means for rigidly securing said reservoir to the receptacle and said receptacle to said support, a weight arranged to rest on the material in the receptacle without preventing the escape of air from said material and receptacle, and means for imparting alternate up and down movement to said support, substantially as described.

2. In apparatus for packing material, the combination of a support for a receptacle, a weight arranged to rest on material in the receptacle, said weight having openings to permit the escape of air therethrough, and means for imparting alternate up and down movement to said support to cause the material to be compacted in the receptacle, substantially as described.

3. In apparatus for packing material, the combination of a support for a receptacle, a weight arranged to rest on material in the receptacle, said weight having openings to permit the escape of air therethrough, a porous device adapted to be interposed between said weight and the material in the receptacle, to prevent the escape of material from the receptacle and means for imparting alternate up and down movement to said support to compact the material in the receptacle, substantially as described.

4. In apparatus for packing material in receptacles, the combination of a support for the receptacle, a reservoir on the receptacle, unitary means for rigidly securing said reservoir to the receptacle and the receptacle to said support to prevent movement of the receptacle and reservoir from operative position, and means for imparting alternate movement in opposite directions to said support, substantially as described.

5. In apparatus of the class described, the combination of a support for a receptacle, a weight arranged to rest on material in the receptacle, means for effecting the raising of said weight from operative position with respect to the receptacle, and means operable automatically when said weight reaches a desired elevation to hold the same in elevated position, substantially as described.

6. In apparatus of the class described, the combination of a support for a receptacle, a weight arranged to rest on the material in the receptacle, means for raising the weight from operative position with respect to the receptacle, means operable automatically when said weight reaches the desired elevation to hold the same in position, and means for releasing said holding means, substantially as described.

7. In apparatus for packing material in receptacles, the combination of a support upon which the receptacle rests, means for rigidly securing the receptacle in position on the support to prevent movement of the receptacle from operative position, means for exerting pressure on the material in the receptacle, means for imparting alternate, rapid, violent movement in opposite directions to the support and means for preventing distortion of the receptacle during such movement.

8. In apparatus for packing material in receptacles, the combination of a support upon which the receptacle rests, means for rigidly securing the receptacle in position on the support to prevent movement of the receptacle from operative position, means for exerting pressure on the material in the receptacle, the air being permitted to escape from the material and receptacle, means for imparting alternate, rapid, violent movement in opposite directions to the support and a casing fitted about and engaging said receptacle to prevent distortion thereof.

9. In apparatus for packing material in receptacles, the combination of a support for the receptacle, means for holding the material in the receptacle under pressure, means interposed between the material and said pressure means for preventing the escape of material from the receptacle and means for imparting alternate movement in opposite directions to said support to cause the material to be compacted in the receptacle.

10. In apparatus for packing material in receptacles, the combination of a support for the receptacle, a weight arranged to rest on the material in the receptacle, the escape of air from said material and receptacle being allowed, means for securing the receptacle on the support, and means for imparting alternate, violent, rapid, up-and-down movement to said support to cause the material to be compacted in the receptacle and the air to be forced from said material.

11. In apparatus for packing material in receptacles, the combination of a support for the receptacle, a weight arranged to rest on the material in the receptacle without preventing the escape of air from the material and receptacle, means for preventing the escape of pulverulent material from the receptacle while permitting the escape of air therefrom, and means for imparting alternate up and down movement to said support to compact the material in the receptacle and to force the air from the material, substantially as described.

12. In apparatus for packing receptacles, a support for the receptacle, a reservoir for the receptacle, means for rigidly securing the reservoir and receptacle to the support and to each other to prevent relative movement thereof, means for exerting pressure on material within said reservoir and receptacle, and means for imparting alternate, rapid, violent movement in opposite directions to said support.

13. In apparatus for packing receptacles, a support for the receptacle, a reservoir for the receptacle, unitary spring controlled means for securing the reservoir, the receptacle and the support together to prevent relative movement thereof, and means for imparting alternate movement in opposite directions to said support.

14. In apparatus for packing receptacles, a support for the receptacle, a reservoir for the receptacle, means comprising a toggle for securing the reservoir, the receptacle and the support together to prevent relative movement thereof, and means for imparting alternate movement in opposite directions to said support.

15. In apparatus for packing receptacles, a support for the receptacle, a reservoir for the receptacle, means comprising a spring operated toggle for securing the reservoir, the receptacle and the support together to prevent relative movement thereof, and means for imparting alternate movement in opposite directions to said support.

16. In apparatus for packing receptacles, a support for the receptacle, a reservoir for the receptacle, means comprising a toggle for securing the reservoir, the receptacle and the support together to prevent relative movement thereof, one member of said toggle being provided with means for manually moving the same into and out of operative position, and means for imparting alternate movement in opposite directions to said support.

17. In apparatus for packing receptacles, the combination of means for holding the material in the receptacle under pressure during the packing operation, a pad interposed between said pressure means and material and means for jigging the receptacle, substantially as described.

18. In apparatus for packing receptacles, a support for the receptacle, a reservoir secured against movement with respect to and projecting into the receptacle, the receptacle being secured on the support, means for holding the material in the receptacle under pressure during the packing operation and means for jigging the support, causing said pressure means to react against the material.

19. In apparatus for packing receptacles, a support for the receptacle, a reservoir secured against movement with respect to and projecting into the receptacle, said receptacle being secured to the support, means for holding the material in the receptacle and reservoir under pressure during the packing operation and for causing a feed of material from the reservoir into the receptacle, means for preventing the distortion of said receptacle during the packing operation, means for jigging the support and means to prevent the escape of material from said receptacle during the jigging operation.

20. In apparatus for packing receptacles, a support for the receptacle, a reservoir secured against movement with respect to and projecting into the receptacle, a weight in said reservoir for holding the material in the receptacle under pressure during the packing operation and feeding material from said reservoir to the receptacle, said weight providing for the escape of air from the receptacle during the packing operation, means interposed between said weight and material to prevent the escape of material past said weight, means for rigidly securing said receptacle to the support, a casing mounted upon said support and encircling the lower end of said receptacle to prevent distortion thereof and means for jigging the support imparting a rapid, violent movement thereto and causing said weight to react on the material.

21. In apparatus for packing receptacles, a reservoir secured against movement with respect to and projecting into the receptacle, means for holding material in the receptacle under pressure during the packing operation and providing for the escape of air therepast, means for jigging the receptacle, and means interposed between said pressure means and said material to prevent the escape of material along with the air from the receptacle during such packing operation.

22. In apparatus for packing receptacles, a reservoir secured against movement with respect to and projecting into the receptacle, a weight for holding material in the receptacle under pressure during the packing operation, means for jigging the receptacle, said weight permitting the escape of air from the receptacle during the packing operation, and means interposed between said weight and material to prevent the escape of material along with the air from the receptacle during such packing operation.

23. In apparatus for packing receptacles, a support for the receptacle, means for holding the material in the receptacle under pressure during the packing operation, means for rigidly securing the receptacle to the support, said apparatus providing for the escape of air during the packing operation, means resting upon said support and inclosing said receptacle for preventing distortion thereof during the packing operation and automatic jigging means for the support for imparting to the same sudden, violent and rapid movements in opposite directions and causing said pressure means to react against the material.

24. In apparatus for packing material in receptacles, the combination of a support for the receptacle, means for rigidly securing the receptacle in position on the support, means for exerting pressure on the material in the receptacle, means for imparting alternate movement in opposite directions to the support, and a casing fitting about the receptacle to prevent distortion thereof.

25. In apparatus for packing materials in receptacles, a reservoir fitted to said receptacle, means for rigidly securing said reservoir, receptacle and support together, a weight in said reservoir for exerting a pressure upon said material and causing the material to feed from said reservoir into the receptacle during the packing operation, means interposed between said material and weight to prevent the escape of material past the weight but to allow the escape of air therepast, a casing encircling the lower end of said receptacle and mounted upon said support for preventing the distortion of the receptacle and means for giving to the support sudden, violent, rapid movements in opposite directions and causing said weight by reason of its inertia to react against said material.

26. In apparatus for packing receptacles, means for holding material in the receptacle under pressure during the packing operation and jigging means for the receptacle adapted to cause said pressure means to act on the material when the receptacle moves in each direction, substantially as described.

27. In apparatus for packing receptacles, a support for the receptacle, a member on the support engaging and inclosing the receptacle for holding it on the support, a reservoir secured to the receptacle and supported thereby, and means for jigging said support, receptacle and reservoir, substantially as described.

28. In apparatus for packing receptacles, a reservoir secured in position relative to the receptacle and movable therewith, a weight movable in said reservoir to compact the material from said reservoir into the receptacle, a rigid member secured to the weight and projecting upwardly therefrom, the distance between the upper end of said member and the bottom of said weight being substantially as great as the depth of the reservoir whereby the member performs the dual function of serving as a gage and providing means for lifting the weight from the reservoir and means for jigging the receptacle and reservoir, substantially as described.

29. The herein described method of packing material which consists in filling a receptacle and an extension thereof with a predetermined amount of material in excess of the capacity of the receptacle, compacting the material by jigging the receptacle rapidly in opposite directions and continuing the jigging until the material has entirely left the extension, substantially fills the receptacle and forms a mass of stone-like consistency therein, substantially as described.

30. The herein described method of packing material which consists in placing in a receptacle a mass of loose material, placing a weight on the material, and compacting the material by jigging the receptacle sufficiently fast to cause said weight to act, by reason of its inertia and of gravity, against the material to compact it upon movement of the receptacle in each direction, substantially as described.

31. The herein described method of packing Portland cement in a barrel having a groove to receive the head thereof which consists in filling the barrel and an extension thereof with a predetermined amount of cement, placing a weight on the material, compacting the material and forcing air therefrom without allowing the escape of cement by jigging the barrel sufficiently fast to cause said weight to act, by reason of its inertia and of gravity, against the material to compact it upon movement of the barrel in each direction, meanwhile preventing the accumulation of cement within said groove and preventing the weight from digging into the material, and continuing the jigging until substantially all the material has left the extension, substantially fills the barrel up to the groove and forms a mass of stone-like consistency therein, substantially as described.

This specification signed and witnessed this 29th day of March, 1915.

WILLIAM H. MASON.

Witnesses:
FREDERICK BACHMANN,
WILLIAM A. HARDY.